United States Patent [19]

Kennedy, Jr. et al.

[11] Patent Number: 4,619,359
[45] Date of Patent: Oct. 28, 1986

[54] MATERIALS HANDLING AND WEIGHING APPARATUS

[75] Inventors: Conrad P. Kennedy, Jr., Beaumont; Harry L. Kennedy, Freeport, both of Tex.

[73] Assignee: Patrick Howard Gibson, Sweeney, Tex.

[21] Appl. No.: 510,879

[22] Filed: Jul. 5, 1983

[51] Int. Cl.[4] .............................................. B65G 37/00
[52] U.S. Cl. ................................ 198/463.5; 198/504; 198/774; 414/749
[58] Field of Search ............... 198/774, 773, 474, 488, 198/614, 504, 459, 463.5, 468.6; 414/156, 749

[56] References Cited

U.S. PATENT DOCUMENTS

| | | | |
|---|---|---|---|
| 2,893,348 | 7/1959 | Pearson | 198/474 X |
| 3,247,949 | 4/1966 | McDougall | 198/614 X |
| 3,420,358 | 1/1969 | Iversen | 198/774 |
| 3,736,997 | 6/1973 | Bottorf | 198/774 X |
| 3,838,769 | 10/1974 | Fishburne et al. | 198/774 X |
| 4,116,619 | 9/1978 | Beck | 198/774 X |
| 4,270,655 | 6/1981 | Noe | 198/774 |
| 4,357,128 | 11/1982 | Gooden et al. | 198/774 X |

FOREIGN PATENT DOCUMENTS

| | | | |
|---|---|---|---|
| 0083751 | 7/1983 | European Pat. Off. | 198/774 |
| 1449479 | 7/1966 | France | 198/774 |
| 56-155108 | 12/1981 | Japan | 198/774 |

Primary Examiner—Joseph E. Valenza
Assistant Examiner—Jonathan D. Holmes
Attorney, Agent, or Firm—Browning, Bushman, Zamecki & Anderson

[57] ABSTRACT

A materials handling and weighing apparatus having a platform movable in a rectangular motion for transferring a work piece in stepwise fashion along a conveying path, the apparatus having a work piece escapement mechanism whereby work pieces are sequenced onto the movable platform one at a time without interference from a succeeding work piece, the weighing apparatus employing load detecting cells upon which the work piece is deposited during a cycle of the movable platform.

44 Claims, 15 Drawing Figures

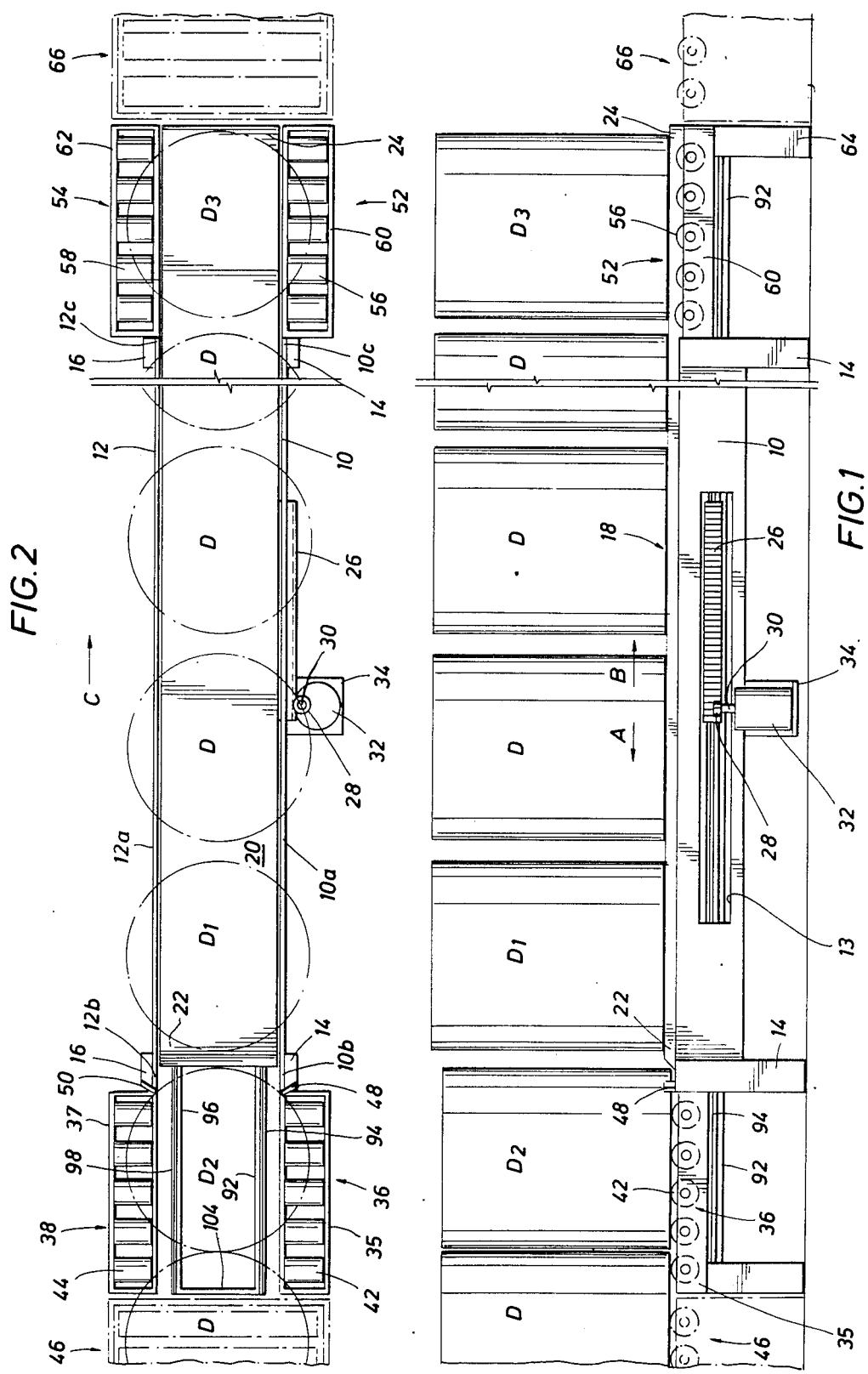

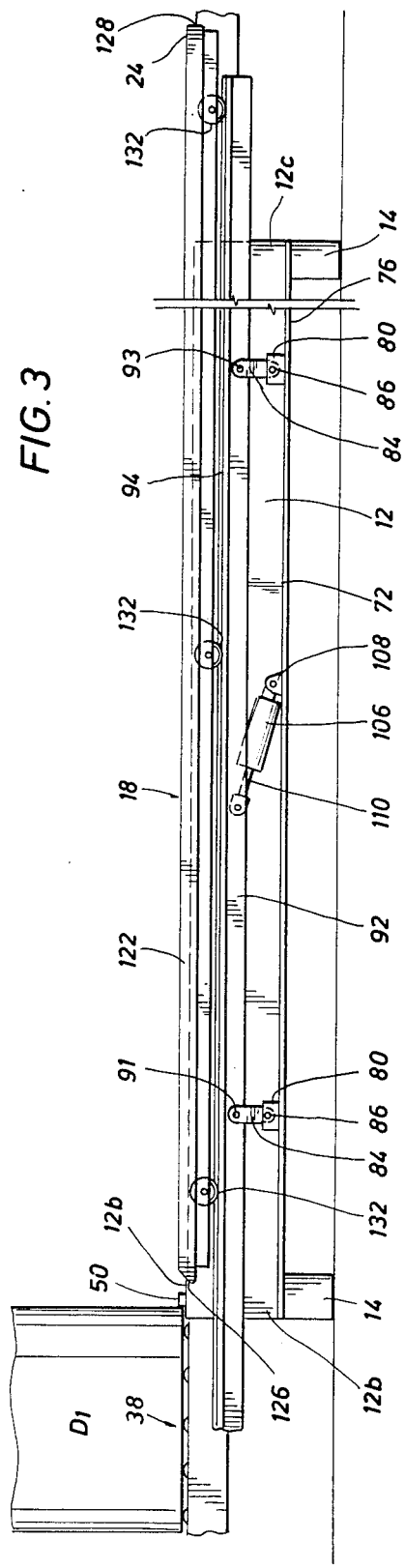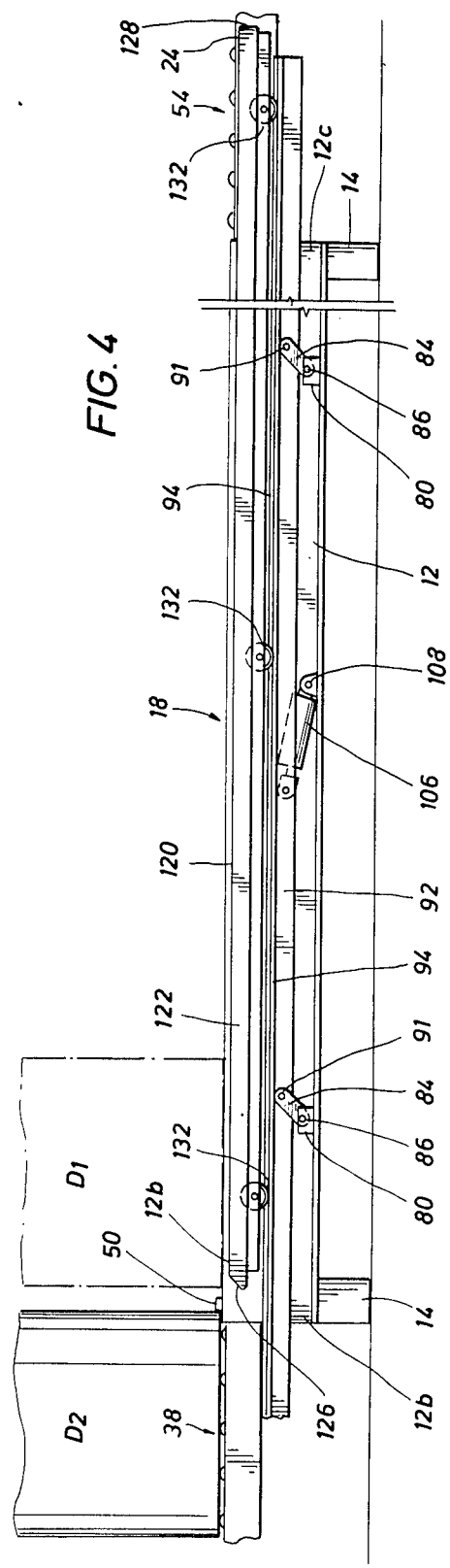

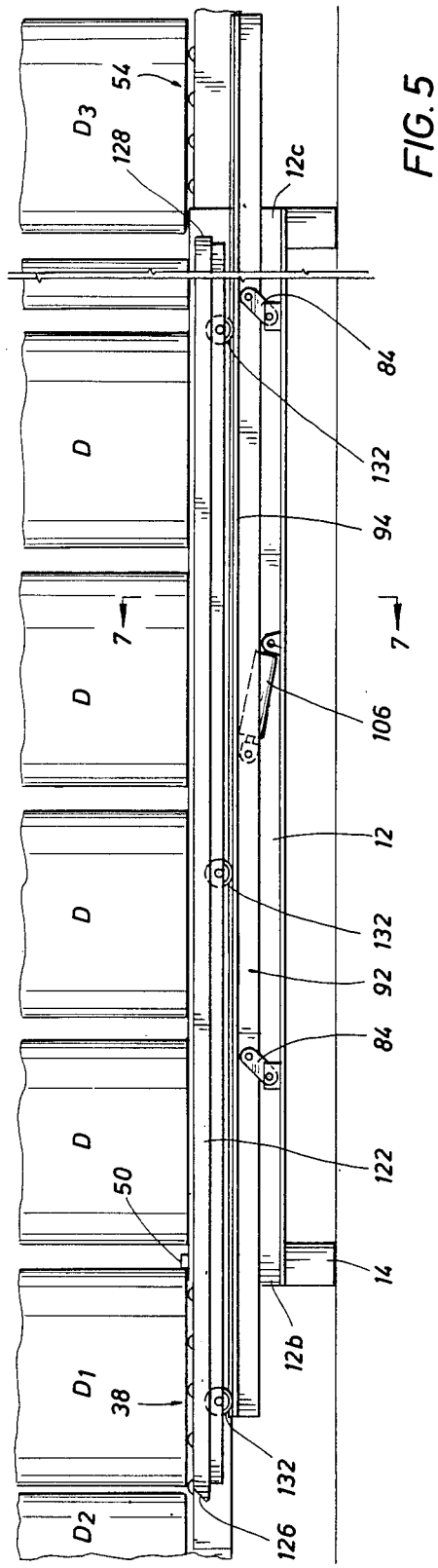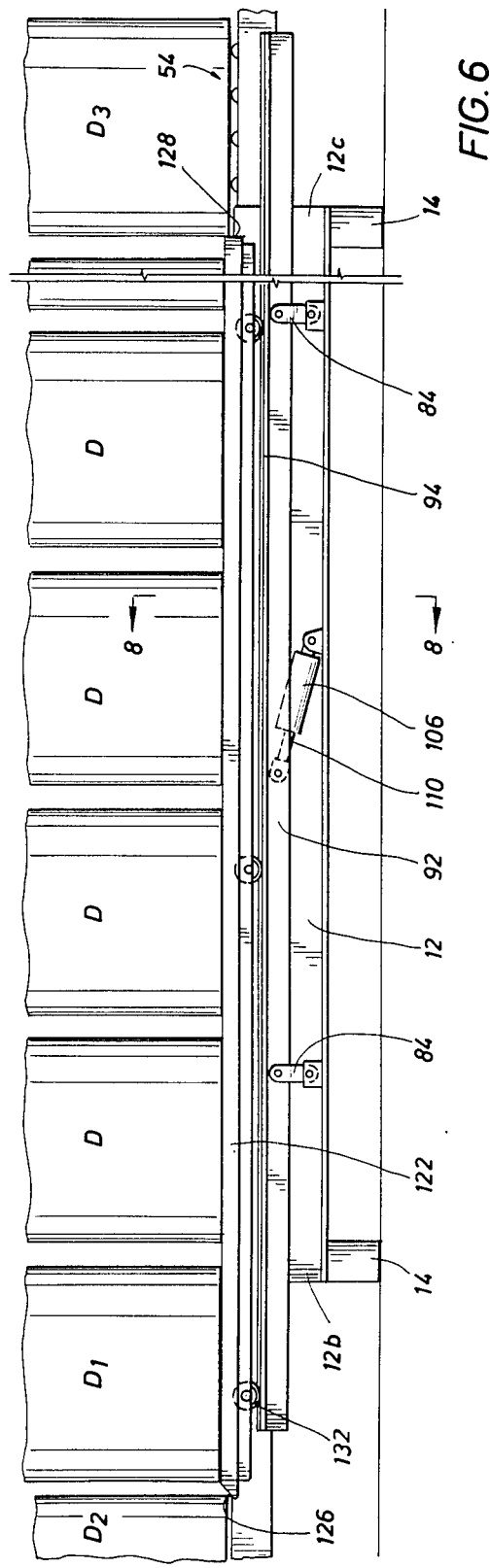

MATERIALS HANDLING AND WEIGHING APPARATUS

BACKGROUND OF THE INVENTION

The present invention relates to materials handling apparatus and, more particularly, to a conveyor of the walking beam or jogging type wherein a work piece is moved step wise along a conveying path. In a particular embodiment, the present invention is directed to a weighing apparatus employing a walking beam conveyor mechanism.

It is common in many industrial applications to employ conveyors both of the continuous and walking beam type to move work pieces, e.g. containers, drums, or the like, along a conveying path along which are spaced work stations at which various operations may be performed on the work piece. For example, in the case of containers or drums which are to be filled with a material, the container can be moved through various stations such as filling/weighing, capping, labelling, etc.

In the filling of containers or drums with either liquid or solid material, it is desirable to perform the filling automatically so as to speed up the operation. In such automated filling systems, it is generally necessary, either manually or with a container alignment apparatus, to align the container on the conveyor system such that the fill opening in the container or drum will be properly aligned beneath a fill valve, spout, filling spear or similar device used to feed the material into the container through the fill opening. In the case of continuous conveyors such as for example roller type conveyors and, as is well known in the art, as a container moves along the rollers it changes orientation because of varying frictional forces encountered as the container moves across the rollers, irregularities in the bottom of the container and other such factors. Thus, assuming that the container was properly oriented at an alignment station on the conveyor path such that the fill valve and the fill opening would be in register when the container moved to the fill station, it will be appreciated that because the container will lose orientation for reasons discussed above, when the container arrives at the fill station the fill valve and the fill opening are frequently not in register. The problem is particularly acute in cases where the fill valve is only slightly smaller than the fill opening since only a small change in the orientation of the container in moving from the alignment station to the fill station will result in the fill valve and the fill opening being out of register. When this occurs, it is necessary for an operator to manually adjust the position of the drum relative to the fill valve so as to place the fill valve and the fill opening in register. Not only is this time consuming, but in the case of hazardous materials such as corrosive or toxic chemicals, it can be a safety hazard as well. Accordingly, it is common practice, when continuous type conveyor systems are used, to align the container at the fill station to ensure proper register between the fill valve and the fill opening. However, this solution is not totally satisfactory since two, relatively time consuming functions must be accomplished at the same station and cannot be accomplished simultaneously. It is clearly desirable to separate the alignment and fill steps thereby eliminating from the time cycle the time of alignment. In this regard it is to be noted that, generally speaking, the fill step is of the longest duration meaning that other operations can be performed on the container during the fill step.

Over and above the problems associated in continuous type conveyor systems, with alignment and filling of a container, there is the added problem that once the container has been filled, it generally moves to a subsequent station(s) for capping of the fill opening. During its movement from the fill station to the capping station(s), and for reasons outlined above, the container will usually change orientation such that if an automatic capping apparatus is used which requires that the fill opening be in a given position, it is necessary, once again, to either manually or automatically align the container at the capping station to bring the capping apparatus and the fill opening into proper orientation or register with one another. It will be appreciated that the capping process may include several work stations such as cap placement, cap securing the cap sealing all of which can generally not be accomplished at the same work station meaning that at each station an alignment problem may be presented. In addition to the above difficulties associated with continuous type conveyors, a problem not to be overlokked, particularly when the material with which the container is to be filled is a liquid material which is of a hazardous nature, is the fact that as the drum or container moves along the conveyor prior to being capped, and whether the continuous conveyor is of the roller type or belt type there is a tendency for the liquid material to "slosh" back and forth either because of intermittent or jerky movement of the conveyor, irregularities in the bottom of the container in contact with the conveyor surface or other such factors. Indeed, the material can slosh out of the fill hole and onto nearby workers posing an extremely serious health hazard. To overcome this problem, it is common at a first fill station to fill the container to a first, predetermined weight and then to "top out" the container with remaining material to the desired fill weight at the capping station. This again is an extremely time consuming operation and requires complicated apparatus.

It is known to use walking beam conveyors for moving containers stepwise through a series of operations or work stations. In walking beam conveyor systems, once the container has been positioned on the moving portion of the walking beam assembly, it continues to move through the conveying cycle stepwise without losing its original orientation so that the container is in registry with each work operation to be performed along the conveying path. A typical walking beam conveyor for use in handling containers is disclosed in U.S. Pat. No. 4,102,450. U.S. Pat. Nos. 3,666,086 and 4,148,400 also disclose walking beam or similar conveyor systems for moving work pieces.

One problem associated with the use of walking beam conveyors is that because of their intrinsic motion, problems are encountered in continuous and automatic feeding of work pieces, e.g. containers, on to the moving support portion of the walking beam conveyor. Walking beam conveyors have a movement, depending upon their particular construction, which follows an approximately rectangular path, or a distorted rectangular path somewhere between a rectangle and a circle. Thus, unlike the continuous type conveyor which forms a single support surface lying and moving generally in a single plane, walking beam conveyors have two support surfaces which are, intrinsically, not always in the same plane.

Weighing systems used with continuous, roller type conveyor systems are complicated and create accuracy problems in weighing. For one, in such weighing systems, it is necessary to "break" the roller conveyor and provide a small, individual section of rollers upon which the drum or container rests at the fill station, the individual section of rollers resting on a scale beneath the fill station. In order to move the drum off of the scale when the fill cycle is completed, the broken section of rollers must also be motorized. Since the scale thus must support not only the drum or container but the roller section as well as the motor, it must have a larger capacity and is, therefore, intrinsically less accurate. Additionally, cleanliness at the fill station becomes a problem. Since the scale is beneath the roller conveyor, any spills that occur can only be effectively cleaned up by moving the scale and its associated roller section from beneath the fill station. This is time consuming and, in the case of filling containers with hazardous materials such as corrosive or toxic chemicals, can pose a health threat to the workers.

SUMMARY OF THE INVENTION

It is therefore an object of the present invention to provide an improved materials handling system employing a walking beam type mechanism.

Yet another object of the present invention is to provide an escapement mechanism for sequencing work pieces, e.g. drums or the like, on to a walking beam conveyor mechanism at predetermined intervals.

Still another object of the present invention is to provide a weighing system for work pieces such as drums, containers and the like employing a walking beam type mechanism.

The above and other objects of the present invention will become apparent from the drawings, the description given herein and the appended claims.

In one embodiment, the materials handling apparatus of the present invention comprises fixed, generally horizontally extending support means providing a first support surface and having a first end and a second end. Adjacent the first end of the fixed support means is a generally horizontally extending feed in means for positioning at least one work piece adjacent the fixed support means. The apparatus also includes stop means for engaging the work piece and preventing longitudinal movement of the work piece along the feed-in means toward the fixed support means. Operatively associated with the fixed support means is movable, generally horizontally extending support means, the movable support means providing a second support surface and having a first end and a second end. The apparatus further includes a means for moving the movable support means to a first position such that the second support surface is below the first support surface, means for moving the movable support means to a second position whereby the second support surface is beneath the work piece when the work piece is in engagement with the stop means, means for moving the movable support means to a third position such that the second support surface is above the feed-in means, the stop means and the first support surface whereby the work piece in engagement with the stop means is lifted off the feed-in means, means for moving the movable support means to a fourth position away from the feedin means for a distance sufficient to position the work piece above the first support surface and means for moving the movable support means to a fifth position whereby the second support surface is below the first support surface and the work piece is deposited on the first support surface. Preferably, there are means for effecting repeated cycles of the movable support means through the first to the fifth positions such that the work piece is moved in discreet steps of pre-determined distance away from the feed-in means.

In another embodiment, the present invention contemplates a weighing apparatus which employs the above-described materials handling apparatus and in which there are load detecting means operatively associated with the first support means for detecting the weight of a work piece which is deposited on the first support surface during at least one cycle of the movable support means thorugh the first to fifth positions.

BRIEF DESCRIPTION OF THE DRAWINGS

FIG. 1 is an elevational, side-view of the materials handling apparatus of the present invention.

FIG. 2 is a plan view of the materials handling apparatus shown in FIG. 1.

FIG. 3 is a side, elevational view, partly in section, showing the movable support means of the materials handling apparatus of the present invention in a first position.

FIG. 4 is a view similar to FIG. 3 showing the movable support means in a second position.

FIG. 5 is a view similar to FIG. 3 showing the movable support means in a third position.

FIG. 6 is a view similar to FIG. 3 showing the movable support means in a fourth position.

DESCRIPTION OF THE PREFERRED EMBODIMENT

Figure 7:
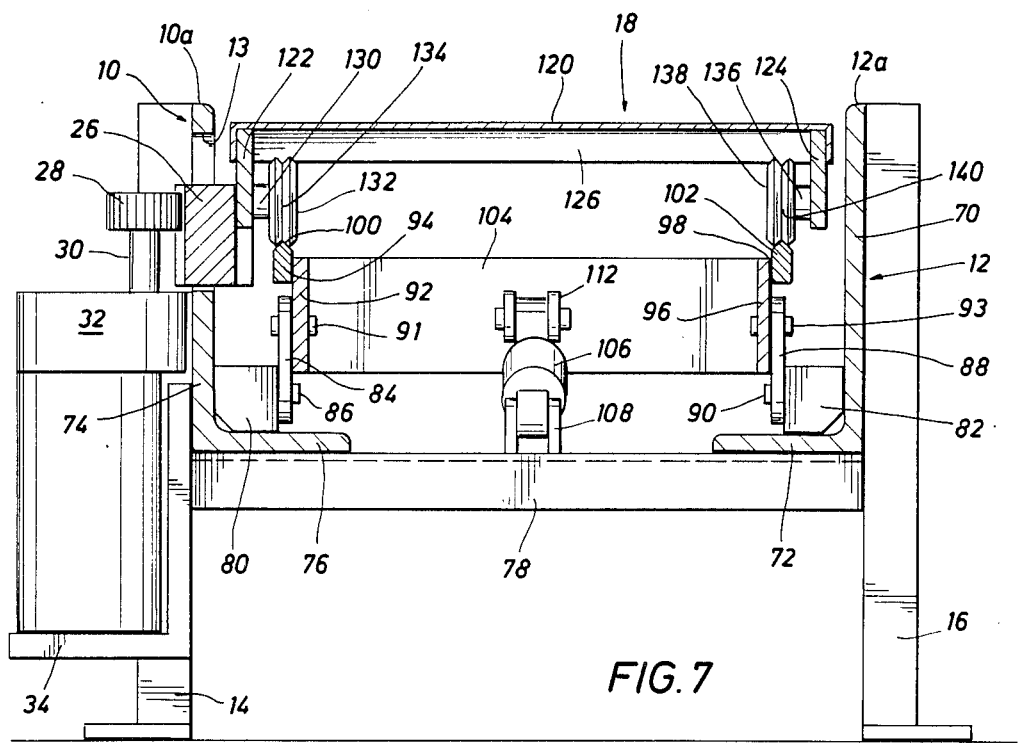
FIG. 7 is a view taken along the lines 7—7 of FIG. 5.

While the materials handling system of the present invention can be used with any type of work pieces which are to be moved along a conveying path through various work stations at which various functions are performed on the work pieces, the invention will be described with particular reference to the filling of containers such as drums, barrels or the like with a material such as, for example, a solid or liquid chemical.

Referring now to FIGS. 1 and 2, the apparatus of the present invention is seen to comprise a pair of generally horizontally extending, generally parallel, spaced apart beams 10 and 12 forming generally coplanar fixed support surfaces 10a and 12a, respectively. Beams 10 and 12 are supported by legs 14 and 16, respectively. Legs 14 are secured to beam 10 generally at opposite, first and second ends 10b and 10c, respectively thereof. Legs 16 are secured to beam 12 generally at opposite first and second ends 12b and 12c, respectively, thereof. Legs 14 and 16 serve to elevate beams 10 and 12, respectively, vertically above a suitable support surface such as a floor or the like.

Operatively associated with and disposed inboard of beams 10 and 12, i.e. between fixed support beams 10 and 12, in a manner more fully described hereafter, is a shuttle or platform, shown generally at 18, providing a substantially planar, movable support surface 20, the shuttle on platform 18 having a first end 22 and a second end 24. A generally horizontally extending toothed rack 26 is secured, in a manner described hereafter, to platform 18 and projects laterally outwardly through a slot 13 in beam 10. Rack 26 is in geared engagement with a pinion 28 secured to a shaft 30, shaft 30 being driven by a rotary actuator 32. Rotary actuator 32 is supported on a support bracket 34 secured to beam 10 below slot 13. Rotary actuator 32 provides an arcuate, oscillatory motion which is converted, via the engagement of pinion 28 and rack 26, into a linear, reciprocating motion of platform 18 in the directions of arrows A and B. Actuator 32 can be electrically powered or can be of the double acting pneumatic or hydraulic type, the only requisite being that it selectively provide opposite rotational modes of pinion 28 so as to selectively move rack 26 in the directions shown by arrows A and B.

It will be apparent that other means such as for example a double acting piston-cylinder combination can also be used to effect the reciprocatory movement of platform 18 as described hereafter. Alternately, a pneumatic cylinder of the air-over-oil type can be used if desired.

Disposed adjacent the first ends 10b and 12b of beams 10 and 12, respectively, is a feed-in means, which is in the form of a split, roller conveyor system comprising a first roller conveyor 36 and a second roller conveyor 38. Roller conveyors 36 and 38 are in generally parallel alignment and spaced from one another for a distance sufficient to allow movement of platform 18 therebetween, as hereafter seen. First roller conveyor 36 is generally in longitudinal alignment with beam 10 while second roller conveyor 38 is generally in longitudinal alignment with beam 12. Conveyors 36 and 38 include idle-rollers 42 and 44, respectively, which are suitably journalled, in a well known manner, in rectangular frameworks 35 and 37, respectively, and abut and are secured on one end, referred to as an escapement end, to beams 10 and 12, respectively, and are vertically supported on the opposing ends by legs 40 and 41 (See FIG. 11).

A conventional, continuous conveyor system 46 which may be of the gravity feed or powered type is disposed closely adjacent the end of conveyors 36 and 38 opposite the escapement ends such that a series of drums D forming a drum line can be fed from continuous conveyor 46 on to the feed-in means, i.e. conveyors 36, 38.

Rigidly secured to support surface 10a of beam 10 at first end 10b is a stop 48 which can be affixed to beam 10 by any suitable means. A similar stop 50 is rigidly affixed to support surface 12a of beam 12 at the first end 12b thereof. As best seen with reference to FIG. 11, conveyor 36 and beam 10 are in abutting relationship while conveyor 31 and beam 12 are likewise in abutting relationship. Though not necessary, as can be seen from FIG. 1, surfaces 10a, 12a and the support surfaces formed by rollers 42 and 44 are substantially coplanar. Accordingly, a drum D resting on the feed-in means, i.e. roller conveyors 36 and 38, and in engagement with stops 48 and 50, cannot move longitudinally, as by sliding, off of conveyors 36 and 38 on to support surfaces 10a and 12a. Thus, a drum D, to be transferred to support surfaces 10a and 12a, must be raised vertically off of rollers 42 and 44 for a distance greater than the vertical heighth of stops 48 and 50 and then translated in the direction shown by arrow B for a distance sufficient to be longitudinally displaced past stops 48 and 50.

Adjacent the second ends 10c and 12c of beams 10 and 12, respectively, is a feed-out means which, like the feed-in means, is in the form of a split roller conveyor system comprising a first roller conveyor 52 and a second roller conveyor 54. Roller conveyors 52 and 54 are in general parallel alignment and spaced from one another for a distance sufficient to allow movement of platform 18 therebetween, as hereafter seen. First roller conveyor 52 is generally in longitudinal alignment with beam 10 while second roller conveyor 54 is generally in longitudinal alignment with beam 12. Conveyors 52 and 54 comprise idler rollers 56 and 58, respectively, which are suitably journaled in rectangular frameworks 60 and 62, respectively are secured on one end, referred to as a receiving end, to beams 10 and 12, respectively, and are vertically supported on their opposing ends by legs 64 and 66 (see FIG. 11).

A conventional, continuous conveyor system 66 which may be of the gravity feed or powered type, is disposed closely adjacent the ends of conveyors 52 and 54 opposite the receiving ends such that drums can be transferred from conveyors 56 and 54 for further disposition. It can thus be seen that continuous conveyor 46, conveyors 36 and 38, movable platform 18, conveyors 52 and 54 and continuous conveyor 66 are in general longitudinal alignment with one another and form a substantially horizontal conveying path in which the movement of drums is in the direction of arrow C, i.e. from conveyor 46 to conveyor 66.

Reference is now made to FIGS. 3-8 for an understanding of a specific embodiment of the materials handling apparatus of the present invention. Beam 12 comprises an elongate, member which is L-shaped in cross-section having a vertical leg 70 and a horizontal leg 72, support surface 12a being formed along the upper edge of vertical leg 70. Beam 10 is likewise an elongate member, L-shaped in cross-section, member having a vertical leg 74 and a horizontal leg 76, support surface 10a being formed along the upper edge of vertical leg 74. A series of cross beams 78 span the distance between beams 10 and 12 and are secured to horizontal legs 72 and 76 to tie beams 10 and 12 together in a rigid framework which is supported by legs 14 and 16. Secured to beams 10 and 12 are lugs 80 and 82, respectively. One end of a link 84, forming part of a linkage assembly, is pivotally secured to lug 80 by means of a pivot pin 86. The other end of link 84 is pivotally secured by a pivot pin 91 to a longitudinally extending track support member 92 which extends generally parallel to and along side of beam 10. Secured to track support member 92 is a longitudinally extending track 94 having a beveled track surface 100, track 94 being generally parallel to and along side of beam 10. Likewise, a link 88, similar to link 84, and forming part of a linkage assembly, is pivotally secured, on one end, to lug 82 by means of a pivot pin 90. Link 88, like link 84, is also pivotally secured at its other end by a pivot pin 93 to a second track support member 96 substantially the same as track support member 92. Secured to track support member 96 and track 98 having a beveled track surface 102. Track support member 96 and track 98 are generally parallel to and along side of beam 12. A series of cross members 104 separate and are connected on opposite ends to track support members 92 and 94.

With reference to FIGS. 3–6, it can be seen that there are two linkage assemblies comprising link 84, one of such assemblies being closer to first end 10b of beam 10, the other of such assemblies being closer to second end 10c of beam 10. Likewise, although not shown, there are two linkage assemblies comprising link 88, one of such linkage assemblies being closer the first end 12b of beam 12, the other of such linkage assemblies being closer the second end 12c of beam 12.

The cylinder 106 of a double-acting hydraulic piston-cylinder combination is pivotally secured by a clevis mount 108 to a generally centrally located cross-member 78, while the free end of piston rod 110 extending from cylinder 106 is pivotally secured by a clevis mount 112 to a generally centrally located cross-member 104.

Figure 8:
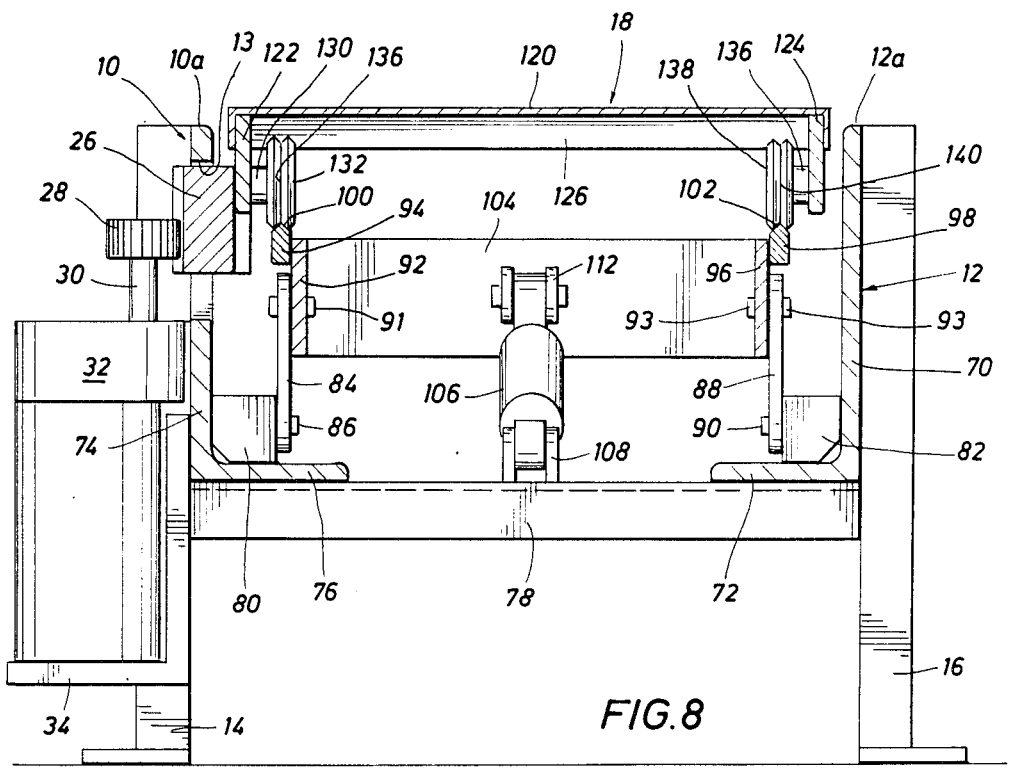
FIG. 8 is a view taken along the lines 8—8 of FIG. 6.

Again with particular reference to FIGS. 7 and 8, platform 18 includes a substantially flat, rectangular top plate 120 affixed to first and second longitudinally extending side rails 122 and 124, respectively. Side rail 122 lies adjacent and generally parallel to beam 10 while side rail 124 lies adjacent and generally parallel to beam 12. The first end 22 of platform 18 is provided with an end member 126 which is transverse to rails 22 and 24 and have a bevelled surface extending downwardly and longitudinally away from surface 20 of platform 18. The second end 24 of platform 18 has an end member 128 which extends generally vertically downward from plate 120 and is affixed at either end to first and second side rails 122 and 124, respectively. Rotatably journalled on side rail 122 and spaced longitudinally therealong are roller assemblies comprising shafts 130 and rollers 132 provided with V-shaped races 134. As seen with reference to FIG. 3, there are three such roller assemblies spaced longitudinally along first side rail 122. Likewise, there are three roller assemblies rotatably secured to side rail 124, said roller assemblies comprising shafts 136 and rollers 138 having V-shaped races 140. Although not shown, it will be appreciated that the roller assemblies on side rail 124 are disposed in the same manner along side rail 124 as the roller assemblies disposed on side rail 122.

With reference to FIG. 4, it can be seen that when piston rod 110 is retracted into cylinder 106, links 84 and 88 will be moved to a first, lower position shown in either of FIGS. 4, 5 or 7. In this lower position of the links, tracks 94 and 98 will be moved to a lower position thereby moving platform 18 which rests on tracks 94 and 98 via roller assemblies 132 and 138 to a lower position. With particular reference to FIGS. 4 and 7, it will be seen that plate 120 and hence surface 20 is now at a position below surfaces 10a and 12a.

If piston rod 110 is now extended, links 84 and 88 will be moved to a second, upper position resulting in upward movement of tracks 94, 98 and hence upward movement of platform 18 to an upper position shown, for example in FIGS. 3, 6 and 8. In this upper position of the links 84, 88, the surface 20 of platform 18 is above the surfaces 10a and 12a. Thus it will be seen that the platform 18 can be moved relative to the beams 10 and 12 such that the support surface 20 on platform 18 can be selectively raised above and lowered below support surfaces 10a and 12a on beams 10 and 12, respectively. While the piston-cylinder combination 110, 106 accomplishes raising and lowering of platform 18, the rack and pinion combination 26, 28 driven by rotary actuator 32 effects horizontal movement of platform 18. Thus, with proper sequencing between the action of rotary actuator 32 and piston cylinder combination 110, 106, it can be seen that platform 18 will move in a substantially rectangular path. It is a particular feature of the present invention that the linkage system in combination with the roller assembly permits a rectangular motion of platform 18 virtually eliminating any circular motion commonly associated with prior art walking beam conveyor systems. Thus, the motion of platform 18 when it is either lifting or lowering a drum is essentially vertical. As will be recognized, this prevents any sliding of the drum as it is transferred from the platform 18 to the beams 10, 12 thus causing a loss in orientation.

To more fully demonstrate the motion of platform 18 and the use of the materials handling apparatus as a conveyor system for the drums or the like, reference is again made to FIGS. 1–8. Assuming that at the commencement of a given cycle platform 18 is in the position shown in FIG. 3, i.e. with support surface 20 above surfaces 10a and 12a, it can now be moved vertically down to the position shown in FIG. 4 by retracting piston 110 into cylinder 106. This will bring surface 20 below surfaces 10a and 12a as well as below the support surface defined by the rollers 42 and 44 of conveyors 36 and 38, respectively, it being remembered that surface 10a, 12a and the support surfaces formed by rollers 42 and 44 are substantially coplanar. Since the rotation between the piston-cylinder combination 110, 106 and rotary actuator 32 is properly sequenced, as soon as the surface 20 moves below surfaces 10a and 12a or as soon as platform 18 reaches the position shown in FIG. 4, rotary actuator, via rack 26 and pinion 28, will cause platform 18 to begin moving longitudinally in the direction of arrow A (FIG. 1), whereby platform 18 will be moved to a first terminal position shown in FIG. 5 which will place the first end 22 of platform 18 between roller conveyors 36 and 38, surface 20 being below the support surface found by rollers 42 and 44 and below drum $D_1$. At this point, piston cylinder combination 110, 106 will be activated whereby links 84 and 88 will move from the position shown in FIG. 5 to the position shown in FIG. 6 resulting in an elevation of the tracks 94, 96 and simultaneous elevation of platform 18 upwardly until surface 20 of platform 18 engages the underside of drum $D_1$, drum $D_1$ thereby being lifted off of roller conveyors 36, 38. As can best be seen with reference to FIG. 6, at this point surface 20 of platform 18 will also be above stops 48, 50. Rotary actuator 32 will now be activated to cause pinion 28 to rotate in a second, rotational mode to thereby drive rack 26, and hence platform 18, in the direction of arrow B (FIG. 1) with the result that platform 18 and hence drum $D_1$ will now be moved to the position shown in FIG. 1. This will place drum $D_1$ over support surfaces 10a, 12a. Retraction of piston 110 into cylinder 106 will now move, in the manner described above, platform 18 back to the position shown in FIG. 4 whereby surface 20 will be below surfaces 10a, 12a, and drum $D_1$, shown in phantom, will now be resting on surfaces 10a, 12a. Thus a cycle will have been completed whereby a drum $D_1$ will have been moved from conveyors 36, 38 in the direction of arrow C (FIG. 2) and be deposited on support surfaces 10a, 12a. It will be appreciated that with repeated cycles as described above, drum $D_1$ will be successively translated, in stepwise fashion, along the conveying path in the direction of arrow C. Since the linear travel of the rack 26 can be accurately preset, the drums D will be translated in discrete steps of predetermined distance from conveyors 36, 38 to conveyors 52, 54. Since there is no sliding or rolling motion of the drums D on either surface 20 or surfaces 10a, 12a such as would run in conventional continuous type conveyors or in prior art walking beam conveyors, once a drum has been properly oriented on platform 18, it will retain that orientation as it is moved stepwise along surfaces 10a, 12a in the direction of arrow C.

Figure 9:
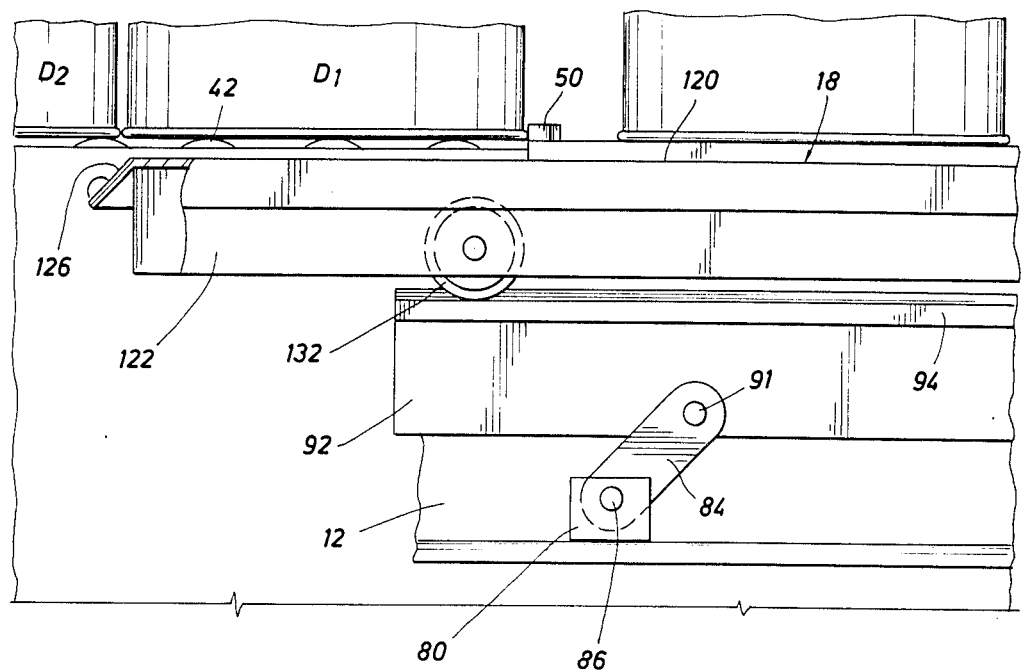
FIG. 9 is an enlarged, fragmentary view of a portion of FIG. 5 showing one form of an escapement mechanism for use with the materials handling apparatus of the present invention with the movable support in a lowered position.
Figure 10:
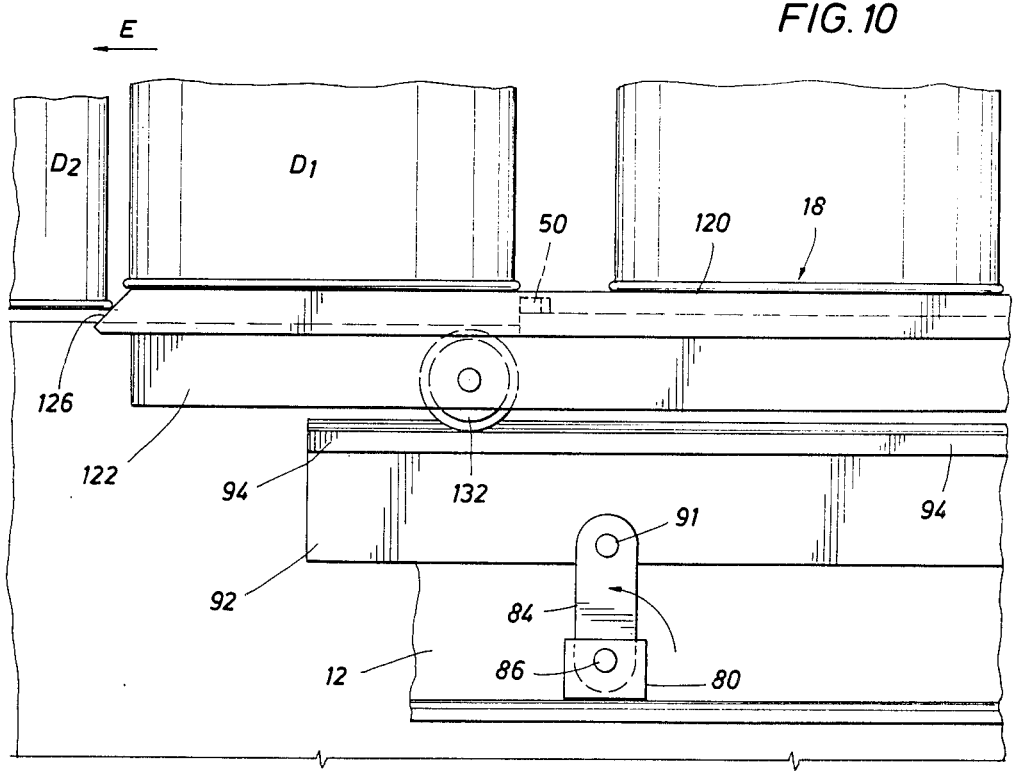
FIG. 10 is a view similar to FIG. 9 and showing the movable support means in a raised position relative to that of FIG. 9.

One of the features of the materials handling apparatus of the present invention is a unique escapement or separation mechanism whereby the drums in a drum line can be separated and sequenced on to platform 18 one at a time without interference from a succeeding work piece, e.g. drum, container or the like. Referring now to FIGS. 9 and 10, which generally correspond to the positions of the platform shown in FIGS. 5 and 6, respectively, it can be seen that as platform 18 is moved upwardly under Drum $D_1$ (FIG. 6) in the manner herein described, the bevelled surface of member 126 will engage the bottom, leading edge of drum $D_2$ immediately adjacent drum $D_1$ resting on conveyors 36, 38. As platform 18 moves upwardly, drum $D_1$ which is in engagement with the stops 48, 50 will be lifted off of rollers 36, 38. However, this upward movement of platform 18 and the engagement of the bevelled surface of member 126 with the bottom edge of drum $D_2$ will force drum $D_2$ and hence all drums along the drum line and behind $D_2$ in the direction of arrow E, i.e. away from stops 48, 50. Thus, with proper sizing of the height of stops 48, 50, before drum $D_1$ is raises sufficiently to clear stops 48, 50, drum $D_2$ will have been moved out of any interfering contact with drum $D_1$ and hence drum $D_1$ will retain the position on surface 20 of platform 18 that it had when first engaged by surface 20 as platform 18 moved upwardly. At this point, as will be understood by those skilled in the art, as $D_1$ is now transferred longitudinally in the direction of arrow C, drum $D_2$ will now be moved against stops 48, 50 such that the cycle can be repeated.

Referring again to FIG. 5, it can be seen that a series of drums has now been moved along the conveying path, i.e. the direction of arrow C, and that a drum $D_3$ has now been transferred and positioned on conveyors 54, 52. In this regard it should be observed that when platform 18 is in the position shown in FIGS. 1 and 2, the second end 24 of platform 18 will be disposed between roller conveyors 52 and 54, the surface 20 of platform 18 lying above the support surfaces formed by rollers 56, 58 of roller conveyors 52, 54. Lowering of platform 18 in the manner described above, e.g. as shown in FIG. 4, will serve to deposit drum $D_3$ on rollers 56 and 58 of roller conveyors 52 and 54. As platform 18 now moves to the position shown in FIG. 6, it will be seen that the second end member 128 of platform 18 will now be raised sufficiently such that any movement of platform 18 in the direction of arrow C, i.e. the conveying path, will engage end member 128 with the bottom edge of drum $D_3$ and shove it off of conveyors 52, 54 onto continuous conveyor 66. Thus, the materials handling apparatus provides a means whereby the drums can be sequenced, individually, and without interference from a succeeding drum onto surface 20, then to surfaces 10a, 12a, ultimately to rollers 52, 54 and can then be sequenced off rollers 52, 54 all by the motion of platform 18 as described above. Indeed, it can be seen that as drum $D_1$ is being raised off of conveyors 36, 38, member 128 is being positioned to stage off drum $D_3$ on to continuous conveyor 66. The actual staging off, of course, occurs when platform 18 has moved to the position shown in FIG. 3, i.e. when the platform 18 is at its second terminal travel position in the direction of arrow C and the second end of platform 18 has moved between rollers 52, 54.

Figure 12:
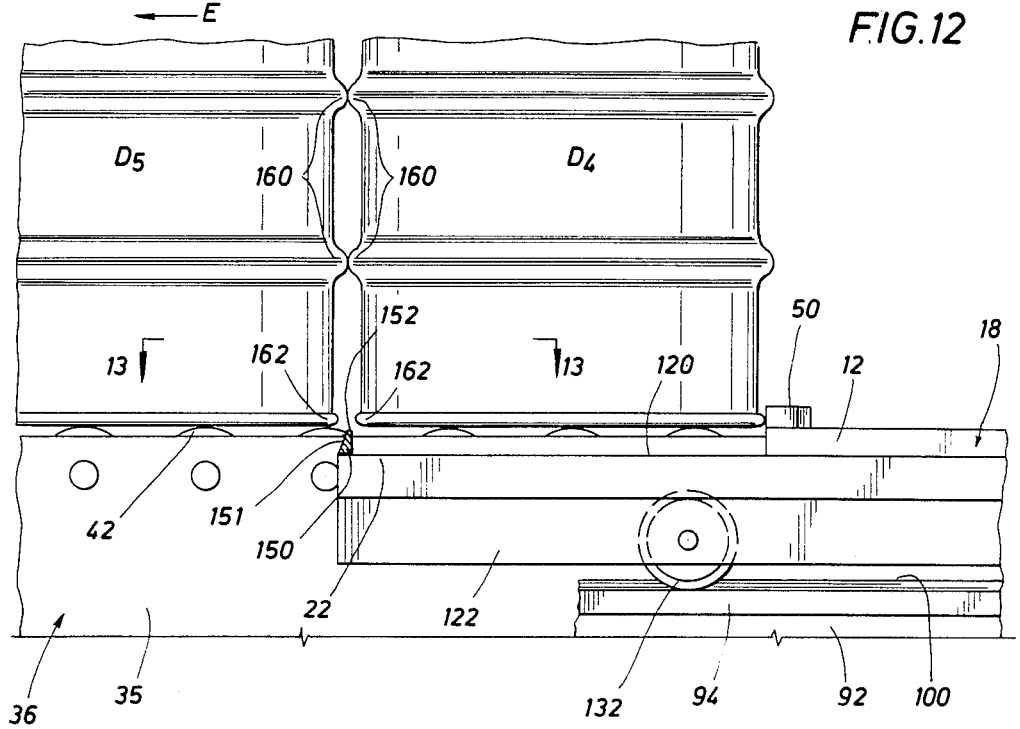
FIG. 12 is a view similar to FIG. 9 showing a different embodiment of an escapement mechanism for use with the materials handling apparatus of the present invention.

Referring now to FIG. 12, there is shown another embodiment of the escapement mechanism of the present invention for permitting individual work pieces, e.g. drums, to be sequenced on to platform 18 without interference from a succeeding drum in the drum line. Secured to the first end 22 of platform 18 and extending generally across the width thereof, i.e. generally from side rail 122 to side rail 124, is a generally wedge shaped member 150 having a bevelled surface 151 which extends generally upwardly and longitudinally toward surface 20 forming a tapered or knife edge 152 projecting above surface 20 of platform 18. Member 150 has a height such that when platform 18 is in its lowermost position as shown in FIG. 12, the upper knife edge 152 of member 150 is substantially level or slightly below surfaces 10a, 12a and the support surfaces formed by rollers 42 and 44 in conveyors 36 and 38, respectively. As seen in FIG. 12, and as is usually the case, drums for containing a liquid chemical or the like are commonly provided with ribs or chines 160 which are circumferentially extending and project radially outwardly from the cylindrical wall of the drum. Thus, when the drums are contiguous one another as in a moving drum line, the chines 160 will be engaged but the bottom rims 162 of adjacent drums will be spaced apart by a distance equal to the combined radial thickness of the chine 160 less the combined radial thickness of the rims 162. This customarily provides a gap between the rims 162 of approximately $\frac{1}{2}''$ to $\frac{3}{4}''$. The travel of platform 18 to its first terminal position along path C and between conveyors 36 and 38 is such that when platform 18 is raised, as above described, the knife edge 152 will pass upwardly in the gap between rim 162 such that the bevelled face 151 of member 150 will engage the bottom rim 162 of drum $D_5$ but there will be no engagement with rim 162 of drum $D_4$ by member 150. It will be appreciated that the thickness of member 150 as measured between the rims 162 when chines 160 are engaged will be such that there will be a gap between member 150 and the rim 162 of drum $D_4$ in engagement with stops 48, 50. Thus, as platform 18 is raised upwardly, the bevelled face of member 150 will engage the rim 162 of drum $D_5$ and force it in the direction of arrow E, i.e. away from drum $D_4$ which is in engagement with the stops 48, 50. Thus, before surface 20 of platform 18 engages the bottom of drum $D_4$ to raise it off conveyors 36, 38 drums $D_4$ and $D_5$ will have been separated and drum $D_4$ can then be cleanly raised off of conveyors 36, 38 without any interference from drum $D_5$.

Figures 13, 14:
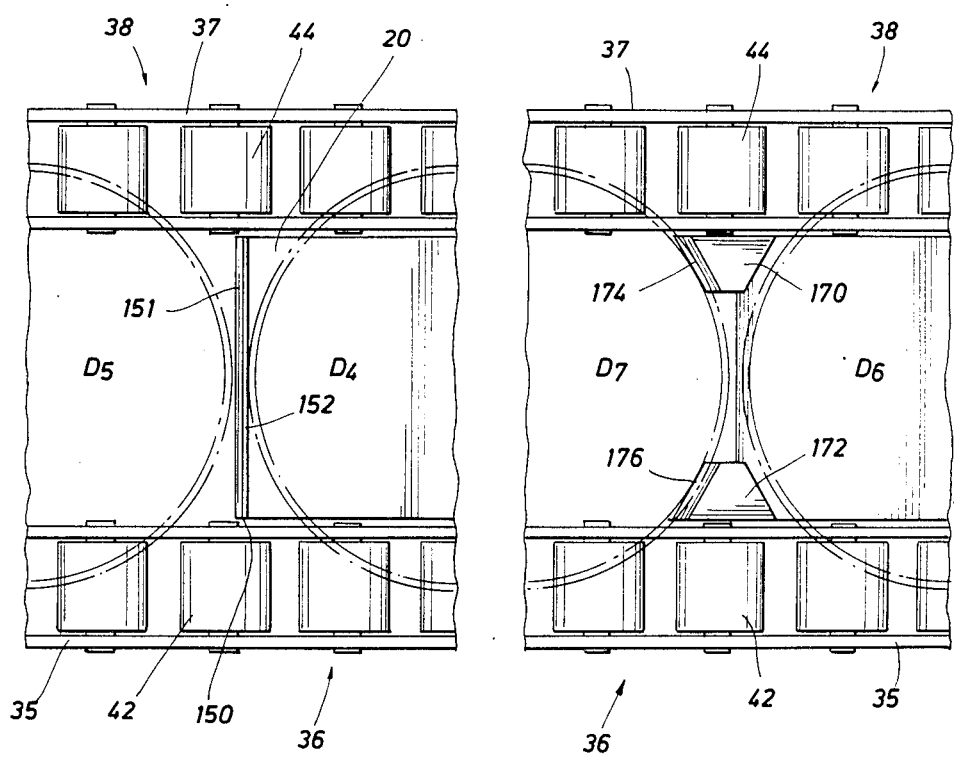
FIG. 13 is a partial, plan view of the escapement mechanism shown in FIG. 12.
FIG. 14 is a view similar to that of FIG. 13 showing a variation of an escapement mechanism for use with the materials handling apparatus of the present invention.

Referring now to FIG. 14 there is shown still another embodiment of the escapement mechanism of the present invention. In this embodiment, the first end 22 of platform 18 is provided with first and second wedge shaped members 170 and 172, respectively which, like member 150 are secured to platform 18 at the first end 22 thrust and extend upwardly above the surface 20 thereof. Wedge shaped member 170 generally overlies side rail 124 while wedge shaped member 172 generally overlies side rail 122. Wedge shaped members 170 and 172 are provided with bevelled surfaces 174 and 176, respectively, which generally extend upwardly and longitudinally toward the surface 20 of platform 18 much like bevelled surface 151 of member 150. Once again, it will be appreciated that as platform 18 is raised, the bevelled surfaces 174 and 176 will contact the rim of drum $D_7$ and because the travel of platform 18 to its first terminal postition is precisely determined and further because of proper sizing and spacing of wedge shaped members 170 and 172, there will be no contact between drum $D_6$ which is in engagement with stops 48, 50, and members 170 and 172. However, upward movement of platform 18 will result in a wedging action against drum $D_7$ by bevelled surfaces 174 and 176 thereby pushing drum $D_7$ and hence the drum line behind the drum $D_7$ back away from drum $D_6$. Once again, this allows drum $D_6$ to be lifted cleanly off of conveyors 36, 38 without any interference from drum $D_7$. Wedge shaped members 170 and 172 also function to center drum $D_7$ on conveyor 46 ensuring that when drum $D_6$ is sequenced of conveyors 36 and 38, drum $D_7$ will be readily forced against both stops 48 and 50 by the advancing drum line. In this regard it will be observed that wedge shaped members 170 and 172 generally form somewhat of a V-shaped, partial abutment surface having a width, at its widest part, greater than the length of a chord of the drum which is less than the diameter of the drum to thereby receive a portion of a drum allowing the drum, when it engages both wedge shaped members, to be centralized with respect to the wedge shaped members.

It will be appreciated that the escapement mechanisms described above provide a means whereby the drums can be precisely positioned as they are removed from conveyors 36, 38 so as to be in proper register with subsequent work stations located along the conveying path shown by arrow C. Thus, assuming that the drums or other work pieces were consistently sized to close tolerances, the escapement mechanisms described above would provide an automatic alignment means whereby the drums would be properly oriented as they were first lifted on to the platform 18 thus eliminating the need for any further alignment stations along the conveying path C.

While as shown, surfaces 10a, 12a and the support surfaces formed by rollers 42, 44 in conveyors 36, 38, respectively are generally coplanar, such is not necessary. For example, surfaces 10a and 12a could be coplanar with each other but disposed above a plane formed by the roller surfaces in conveyors 36, 38. In such a case, the first end 10b, 12b of beams 10, 12, respectively, would act as stops since as a drum was positioned on roller conveyors 36, 38, the following drum line would force it to abut the ends of beams 10, 12 which would act as stops. In this case, stops 48 and 50 could be dispensed with.

Figure 11:
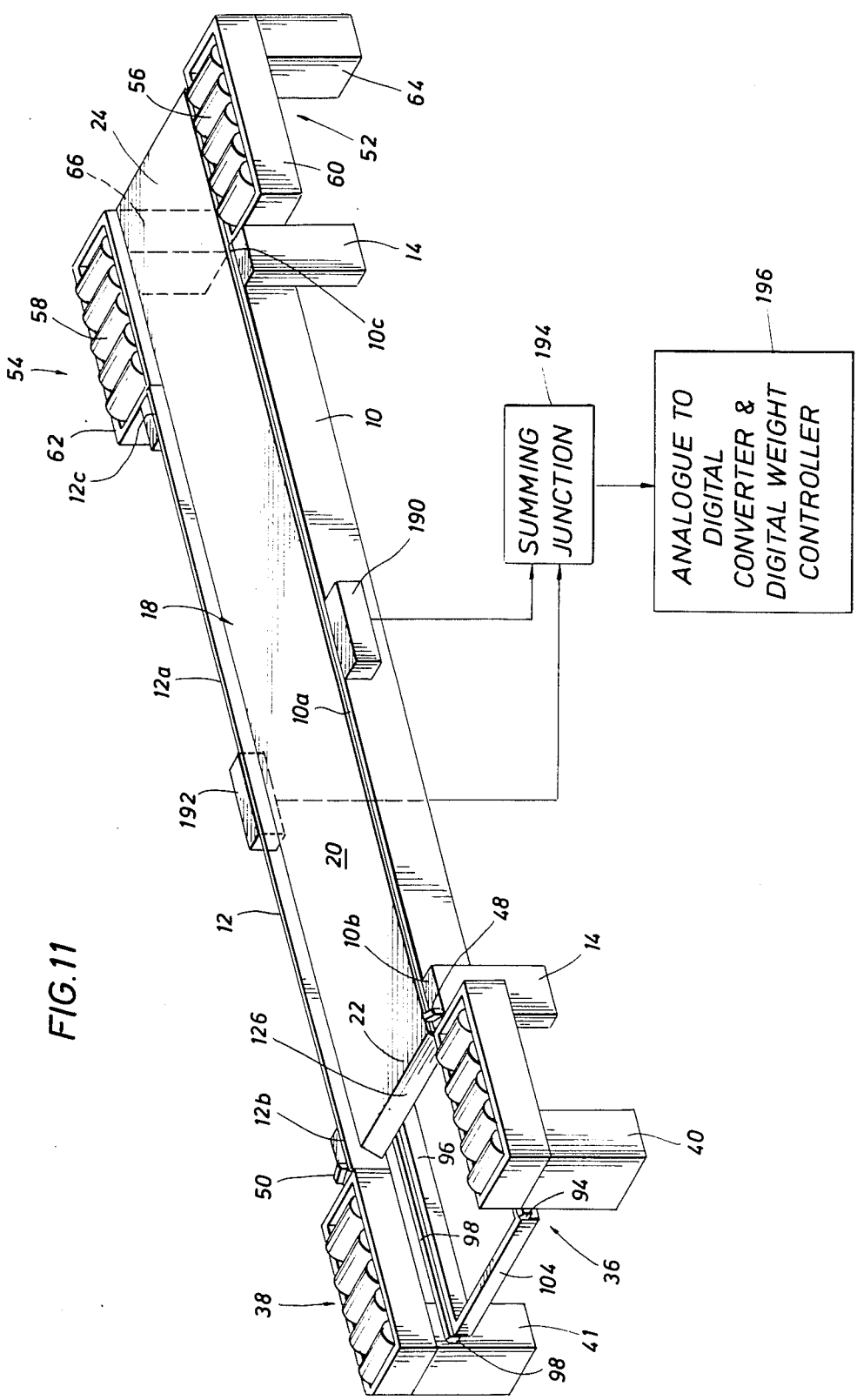
FIG. 11 is a perspective view showing the weighing apparatus of the present invention.

Referring now to FIG. 11, there is shown a weighing apparatus incorporating the materials handling apparatus of the present invention. The weighing apparatus shown in FIG. 11 is substantially the same as that shown in FIGS. 1–10 and 14 with the exception that, for simplicity, the rack and pinion mechanism depicted in FIGS. 1 and 2 has been deleted and the rollers and linkage assemblies have not been shown. Secured to beams 10 and 12 are load cells 190 and 192, respectively. Load cells 190 and 192 which are in reality strain gages are of the shear beam type and are secured generally outboard of beams 10 and 12 so as to not interfere with the movement of platform 20 therebetween. Load cells 190 and 192 are positioned on beams 10 and 12, respectively, such that during at least one cycle of platform 18 as described above, the work piece e.g. drum, will be placed on load cells 190 and 192. Since the load cells 190 and 192 project slightly above the surfaces 10a and 12a, respectively, the weight of the drum will be directly borne by the load cells. Each load cell generates an analog signal proportional to the force applied to each by the drum. The analog output of cells 190 and 192 are sent to a summing junction 194 to provide a common output signal which is converted to digital information by a digital converter and digital weight controller 196. It will be understood by those skilled in the art that while the drum is disposed on load cells 190, 192, a variety of weighing related functions can be accomplished. For one, an automatic tare of the drum can be determined. The drum can also be filled to a desired weight or emptied to a desired weight as the case may be. Additionally, the weighing station can simply be used to check the weight of a pre-filled drum. By positioning several sets of load cell sensing elements at several stations along conveying paths C, various amounts of different materials may be metered into the drum at successive stations so as to provide a method for formulating various compositions in the drum.

As can be seen from the description above, the weighing apparatus of the present invention does not employ a continuous type conveyor, e.g. a roller conveyor, having a separate, motorized section supported on a scale and upon which the drum rests when it is being weighed, either for filling, emptying or for any other desired weighing function. Thus, whereas in the case of most conventional prior art weighing systems employing continuous type conveyors wherein the scale has to bear the weight of the drum as well as the weight of the roller section and its power source in the weighing apparatus of the present invention, the load detecting cells bear only the weight of the drum. It will be recognized that this is particularly important when either a tare weight or a net fill weight is being obtained. In the case of the conventional prior art systems, the weight of the supporting roller section and its power source, e.g. motor, is quite significant relative to the tare weight of the drum. Accordingly, and since it is necessary to use a larger scale to accommodate the larger overall weight being encountered, accurate tare weight as well as net full weight was and is a problem. This problem is essentially eliminated by the weighing apparatus of the present invention since the load cells see only the load of the drum and not of any rollers, means to power the rollers or peripheral type equipment. Thus, the load cells, because they are encountering a considerably smaller overall weight do not have to have a large weighing capacity and hence are much more accurate. Additionally, since there is no scale or other weighing mechanism beneath the weighing apparatus of the present invention, problems associated with cleanliness caused by spills and the like are eliminated. It can be seen that if a spill occurs at the weighing station, i.e. when the drum is on the load cells, it can be easily cleaned up as by flushing away to a suitably disposed drain by a worker at a sufficient distance from the weigh station to avoid any close contact with the spillage.

Figure 15:
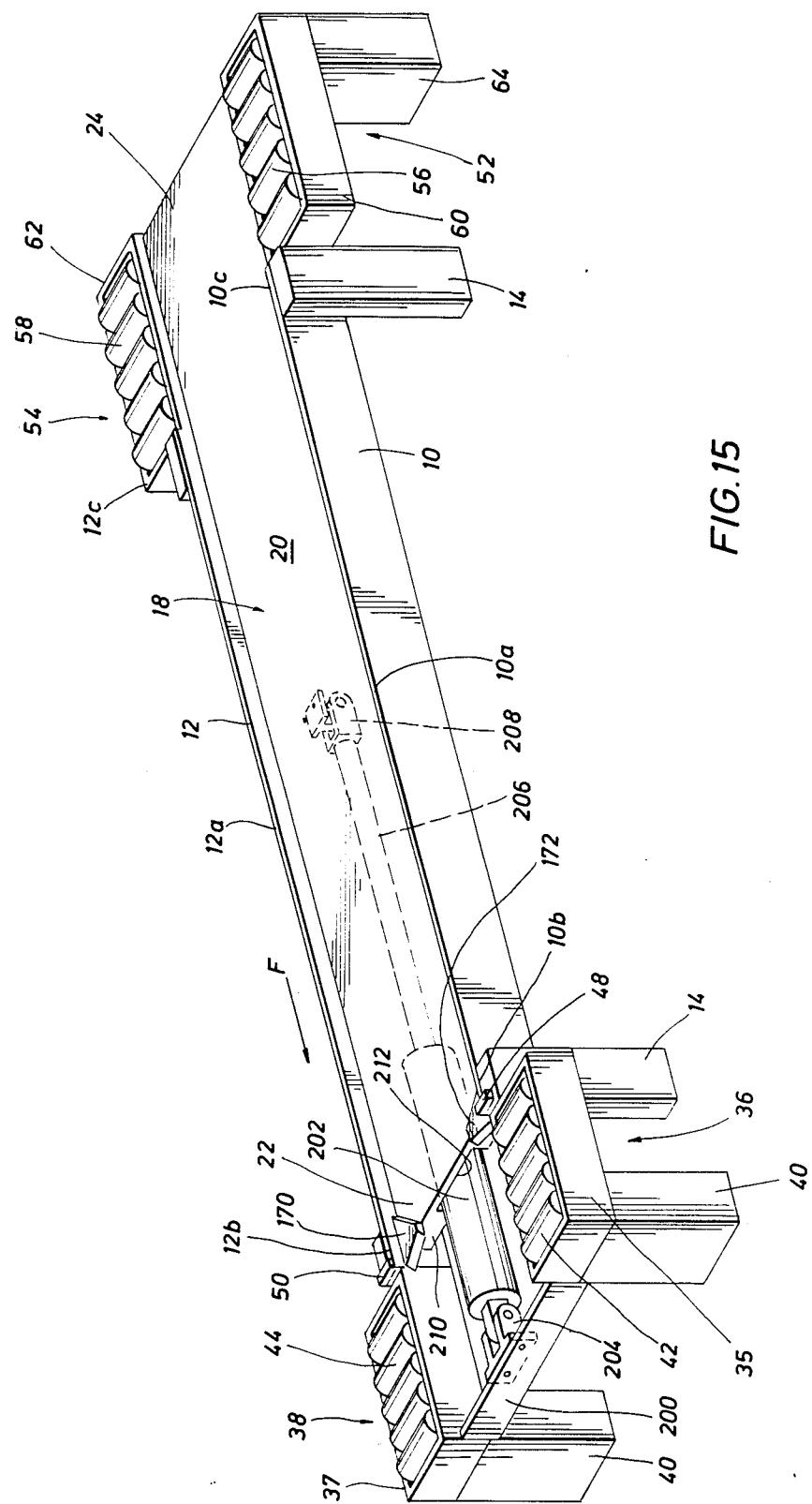
FIG. 15 is a view similar to FIG. 11 showing another embodiment of an assembly for reciprocating the movable support means longitudinally along the materials handling apparatus of the present invention.

As noted above, while the rack and pinion mechanism described is effective in accomplishing the longitudinal, reciprocating motion of the platform 18 in its first and second horizontal, terminal positions, a most effective substitute for the rack and pinion mechanism is a double acting pistoncylinder combination, particularly a pneumatic, air-over-oil piston-cylinder system. Referring now to FIG. 15, there is shown a modification of the present invention employing such a cylinder to reciprocate the platform 18. For simplicity, the roller and linkage system, as in the case of FIG. 11, has been deleted. In all other respects, except for the substitution of the rack and pinion system by the piston-cylinder combination hereinafter described, the apparatus shown in FIG. 15 is essentially the same as that shown in FIGS. 1-10 and 14. Disposed between conveyors 36 and 38 is a cross member 200 having one end affixed to rectangular frame 35 of conveyor 36 and the other end affixed to a rectangular frame 37 of conveyor 38. Member 200 is displaced vertically downwardly from the support surfaces formed by rollers 42 and 44 such that when platform 18 is moved in the direction of arrow F, i.e. between conveyors 36 and 38, it will not abut or touch the cross member 200. The cylinder portion 202 of a piston-cylinder combination is pivotally secured to member 200 by clevis connection 204. The piston rod 206 of the piston-cylinder combination extends beneath platform 18, the free end of piston rod 106 being pivotally secured to the underside of platform 18 approximately at its longitudinal midpoint by means of a clevis connection 208. To permit longitudinal movement of platform 18 without interference from cylinder 202, platform 18 is provided with a first end member 210 having a generally rectangular cut out portion 212 to accommodate cylinder 202. Thus, platform 18 can be reciprocated from a postion wherein the first end 22 is between conveyors 36 and 38 to a position wherein the second end 24 is between conveyors 52 and 54 without interference between cylinder 202 and platform 18. While cylinder 202 can comprise any type of double-acting pneumatic or hydraulic piston-cylinder combination, it has been found especially useful to employ a double-acting pneumatic cylinder of the air-over-oil type. The structure and function of such air-over-oil piston-cylinder combinations is well known to those skilled in the art and need not be described in detail herein. In any event, the use of such an air-over-oil piston-cylinder combination provides a longitudinal movement of platform 18 which is smooth and free of any jerkiness or intermittent motion. This smooth motion is particularly important when the apparatus is used to carry drums filled with a liquid in which case a jerky motion would impart sloshing of the liquid in the drums as they are being translated horizontally along the conveying path.

While the invention has been described above with respect to a fixed support means between which a movable support means is disposed, it will be understood that depending on the type of work pieces with which the materials handling system is used, the relationship of the fixed and movable support means may be reversed. Thus for example the platform 18 could be made fixed while beams 10 and 12 were caused to move in the motion described above with respect to platform 18. Additionally, it is possible to construct the materials handling system of the present invention whereby both the movable support means and the fixed support means are in the form of beams such as beams 10 and 12.

The foregoing description represents only one preferred embodiment of the invention, and it should be understood that numerous modifications could be made within the spirit of the invention. Accordingly, it is intended that the scope of the present invention be limited only by the claims which follow.

What is claimed is:

1. Materials handling apparatus comprising:

fixed, generally horizontally extending support means having a first support surface, a first end and a second end;

feed in means adjacent said first end of said fixed support means for positioning at least one work piece adjacent said fixed support means, said feed in means being generally horizontally extending;

stop means for engaging said work piece and preventing longitudinal movement of said work piece along said feed in means toward said fixed support means;

movable, generally horizontally extending support means operatively associated with said fixed support means, said movable support means having a substantially planar second support surface, a first end and a second end, said first end of said movable support means being closest to said feed in means, said first end of said movable support means including separating means for separating said work piece abutting said stop means from a second work piece contiguous said work piece abutting said stop means by forcing said second work piece in an upstream direction away from said stop means and said work piece abutting said stop means;

means for moving said movable support means to a first position whereby said second support surface is below said first support surface;

means for moving said movable support means to a second position whereby said second support surface is beneath said work piece when said work piece is in engagement with said stop means;

means for moving said movable support means to a third position whereby said second support surface is above said feed in means, said stop means and said first support surface whereby said work piece is lifted off said feed in means;

means for moving said movable support means to a fourth position away from said feed in means for a distance sufficient to position said work piece above said first support surface; and means for moving said movable support means to a fifth position whereby said second support surface is below said first support surface and said work piece is deposited on said first support surface without change in angular orientation.

2. The apparatus of claim 1 wherein said separating means comprises a member on said first end of said movable support means forming a beveled surface, said beveled surface extending downwardly and longitudinally away from said second support surface.

3. The apparatus of claim 1 wherein said separating means comprises at least one generally wedge shaped member secured to said first end of said movable support means, said wedge shaped member having a tapered edge projecting above said second support surface.

4. The apparatus of claim 3 wherein there are first and second spaced apart wedge shaped members, each of said first and second wedge shaped members having a bevelled surface, said bevelled surface extending generally upwardly from said second support surface and generally toward said second end of said movable support means.

5. The apparatus of claim 1 wherein said fixed support means comprises first and second, generally parallel, spaced apart beams and said movable support means comprises a platform having a generally planar surface forming said second support surface and disposed between said first and second beams.

6. The apparatus of claim 1 wherein said feed in means comprises first and second, generally parallel, spaced apart feed in conveyor means, the space between said first and second feed in conveyor means being sufficient to permit movement of said first end of said movable support means therebetween.

7. The apparatus of claim 6 wherein said first and second feed in conveyor means comprise roller type conveyors including a plurality of rollers, said rollers defining a work piece positioning surface, said work piece positioning surface being substantially coplanar with said first support surface.

8. The apparatus of claim 6 wherein said fixed support means comprises first and second, generally parallel, spaced apart beams, each of said beams having a first and a second end, and said movable support means comprises a platform having a generally planar surface forming said second support surface and disposed between said first and second beams.

9. The apparatus of claim 8 wherein each of said first and second feed in conveyor means has an escapement end, said escapement end of said first feed in conveyor means being adjacent said first end of said first beam, said escapement end of said second feed in conveyor means being adjacent said first end of said second beam.

10. The apparatus of claim 9 wherein said stop means is disposed generally at the first ends of said first and second beams.

11. The apparatus of claim 10 wherein said stop means comprise first and second stop members secured to said first and second feed in conveyor means respectively, and substantially at the escapement ends thereof.

12. The apparatus of claim 1 including means for effecting repeated cycles of said movable support means through said first to fifth positions whereby said work piece is moved in discreet steps of predetermined distance away from said feed in means.

13. The apparatus of claim 12 including a feed out means adjacent said second end of said fixed support means for receiving a work piece from said movable support means.

14. The apparatus of claim 13 wherein said feed out means comprises first and second, generally parallel, spaced apart feed out support means, the space between said feed out support means being sufficient to permit movement of said second end of said movable support means therebetween.

15. The apparatus of claim 14 wherein each of said feed out support means comprises feed out conveyor means.

16. The apparatus of claim 15 wherein said fixed support means comprises first and second, generally parallel, spaced apart beams, each of said beams having a first end and a second end, and said movable support means comprises a platform having a generally planar surface forming said second support surface and disposed between said first and second beams.

17. The apparatus of claim 16 wherein each of said first and second feed out conveyor means has a receiving end, said receiving end of said first feed out conveyor means being closely adjacent said second end of said first beam, said receiving end of said second feed out conveyor means being closely adjacent said second end of said second beam.

18. The apparatus of claim 1 wherein said fixed support means includes a framework and there are track means connected to said framework.

19. The apparatus of claim 18 wherein said movable support means includes roller means engageable with and supportable on said track means whereby said movable support means can move longitudinally with respect to said fixed support means.

20. The apparatus of claim 19 wherein said movable support means further includes a generally horizontally extending rack member attached to said movable support means, said rack member being engageable with a drivable pinion and there are means for selectively, driving said pinion in a first rotational mode so as to move said movable support means to said second position and in a second rotational mode so as to move said movable support means to said fourth position.

21. The apparatus of claim 20 wherein said means for selectively driving said pinion comprises a rotary actuator secured to said framework.

22. The apparatus of claim 21 wherein said track means is connected to said framework by a movable linkage assembly, said linkage assembly being movable between an upper position wherein said second support surface is above said first support surface and a lower position wherein said second support surface is below said first support surface.

23. The apparatus of claim 22 wherein there are means for moving said linkage assembly between said upper and lower positions.

24. The apparatus of claim 23 wherein said framework includes a framework member fixed with respect to said track means and said means for moving said linkage assembly comprises a piston-cylinder combination, said piston-cylinder combination being interconnected between said framework member and said track means.

25. The apparatus of claim 19 wherein said movable support means includes a generally horizontally disposed piston-cylinder combination, said piston-cylinder combination being interconnected between said movable support means and a rigid support member, fixed with respect to said movable support member.

26. The apparatus of claim 25 wherein said piston-cylinder combination comprises a double-acting air-over-oil pneumatic cylinder.

27. Apparatus for weighing a work piece comprising:
fixed, generally horizontally extending support means having a first support surface, a first end and a second end;
feed in means adjacent said first end of said fixed support means for positioning at least one work piece adjacent said fixed support means, said feed in means being generally horizontally extending;
stop means for engaging said work piece and preventing longitudinal movement of said work piece along said feed in means toward said fixed support means;

movable, generally horizontally extending support means operatively associated with said fixed support means, said movable support means having a substantially planar second support surface, a first end and a second end, said first end of said movable support means being closest to said feed in means, said first end of said movable support means including separating means for separating said work piece abutting said stop means for a second work piece contiguous said work piece abutting said stop means by forcing said second work piece in an upstream direction away from said stop means and said work piece abutting said stop means;

means for moving said movable support means to a first position whereby said second support surface is below said first support surface;

means for moving said movable support means to a second position whereby said second support surface is beneath said work piece when said work piece is in engagement with said stop means;

means for moving said movable support means to a third position whereby said second support surface is above said feed in means, said stop means and said first support surface whereby said work piece is lifted off said feed in means;

means for moving said movable support means to a fourth position away from said feed in means for a distance sufficient to position said work piece above said first support surface;

means for moving said movable support means to a fifth position whereby said second support surface is below said first support surface and said work piece is deposited on said first support surface after having been moved in only rectilinear steps without rotational components;

means for effecting repeated cycles of said movable support means through said first to fifth positions whereby said work piece is moved in discreet steps of predetermined distance away from said feed in means; and load detecting means operatively associated with said first support means for detecting the weight of said work piece deposited on said first support surface during at least one of said cycles.

28. The apparatus of claim 27 wherein said fixed support means comprises first and second, generally parallel, spaced apart beams and said movable support means comprises a platform having a generally planar surface and disposed between first and second beams.

29. The apparatus of claim 27 wherein said load detecting means comprise first and second load cells secured to said first and second beams, respectively.

30. The apparatus of claim 29 including means operatively connected to said load cells for determining the weight of said work piece.

31. The apparatus of claim 29 wherein said stop means is disposed generally at the first ends of said first and second beams.

32. The apparatus of claim 31 wherein said stop means comprise first and second stop members secured to said first and second beams, respectively, and substantially at the first ends thereof.

33. The appartus of claim 27 wherein said separating means comprises a member on said first end of said movable support means forming a beveled surface, said beveled surface extending downwardly and longitudinally away from said second support surface.

34. The apparatus of claim 27 wherein said separating means comprises at least one generally wedge shaped member secured to said first end of said movable support means, said wedge shaped member having a tapered edge projecting above said second support surface.

35. The apparatus of claim 34 wherein there are first and second spaced apart wedge shaped members, each of said first and second wedge shaped members having a beveled surface, said beveled surface extending generally upwardly from said second support surface and generally toward said second end of said movable support means.

36. The apparatus of claim 27 wherein said feed in means comprises first and second, generally parallel, spaced apart feed in conveyor means, the space between said first and second feed in conveyor means being sufficient to permit movement of said first end of said movable support means therebetween.

37. The apparatus of claim 36 wherein said first and second feed in conveyor means comprise roller type conveyors including a plurality of rollers, said rollers defining a work piece positioning surface, said work piece positioning surface being substantially coplanar with said first support surface.

38. The apparatus of claim 36 wherein said fixed support means comprises first and second, generally parallel, spaced apart beams, each of said beams having a first and a second end, and said movable support means comprises a platform having a generally planar surface forming said second support surface and disposed between said first and second beams.

39. The apparatus of claim 38 wherein each of said first and second feed in conveyor means has an escapement end, said escapement end of said first feed in conveyor means being adjacent said first end of said first beam, said escapement end of said second feed in conveyor means being adjacent said first end of said second beam.

40. The apparatus of claim 27 including a feed out means adjacent said second end of said fixed support means for receiving a work piece from said movable support means.

41. The apparatus of claim 40 wherein said feed out means comprises first and second, generally parallel, spaced apart feed out support means, the space between said feed out support means being sufficient to permit movement of said second end of said movable support means therebetween.

42. The apparatus of claim 41 wherein each of said feed out support means comprises feed out conveyor means.

43. The apparatus of claim 42 wherein said fixed support means comprises first and second, generally parallel, spaced apart beams, each of said beams having a first end and a second end, and said movable support means comprises a platform having a generally planar surface forming said second support surface and disposed between said first and second beams.

44. The apparatus of claim 43 wherein each of said first and second feed out conveyor means has a receiving end, said receiving end of said first feed out conveyor means being closely adjacent said second end of said first beam, said receiving end of said second feed out conveyor means being closely adjacent said second end of said second beams.

* * * * *